United States Patent
Jufer et al.

(10) Patent No.: US 11,775,664 B2
(45) Date of Patent: Oct. 3, 2023

(54) BLOCKCHAIN MANAGED ACCESS SYSTEM

(71) Applicant: NAGRAVISION SARL, Cheseaux-sur-Lausanne (CH)

(72) Inventors: Romain Jufer, Cheseaux-sur-Lausanne (CH); Cristian Ruiz, Cheseaux-sur-Lausanne (CH); Olivier Morel, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 120 days.

(21) Appl. No.: 17/392,013

(22) Filed: Aug. 2, 2021

(65) Prior Publication Data

US 2023/0035317 A1    Feb. 2, 2023

(51) Int. Cl.
*G06F 21/62* (2013.01)
*G06F 21/33* (2013.01)
*H04L 9/00* (2022.01)

(52) U.S. Cl.
CPC ........ *G06F 21/6209* (2013.01); *G06F 21/335* (2013.01); *H04L 9/008* (2013.01); *H04L 9/50* (2022.05)

(58) Field of Classification Search
CPC ... G06F 21/6209; G06F 21/335; H04L 9/008; H04L 9/50
USPC .......................................................... 726/28
See application file for complete search history.

(56) References Cited

U.S. PATENT DOCUMENTS

| | | | |
|---|---|---|---|
| 10,055,601 B1* | 8/2018 | Hamid | H04L 9/088 |
| 2017/0116693 A1* | 4/2017 | Rae | G06Q 50/184 |
| 2019/0065709 A1* | 2/2019 | Salomon | G06F 8/71 |
| 2019/0253252 A1* | 8/2019 | Qiu | H04L 9/3247 |
| 2019/0342084 A1* | 11/2019 | Mehedy | H04L 9/0825 |
| 2019/0372756 A1* | 12/2019 | Kim | H04L 9/3263 |

* cited by examiner

*Primary Examiner* — Jacob Lipman
(74) *Attorney, Agent, or Firm* — POLSINELLI LLP

(57) ABSTRACT

The present disclosure relates generally to data access control solutions. In particular, techniques are provided to implement a secure and distributed file storage scheme and in particular, a managed access system using a blockchain. In some aspects, a process of the disclosed technology includes operations for associating a first key share with a first copy of a file, wherein the first copy of the file is stored by a first party, associating a second key share with a second copy of the file, and recording versioning information corresponding with the file on a distributed ledger accessible by the first party and the second party. In some aspects, the process can further include operations for managing access to the file using the first key share and the second key share. Systems and machine-readable media are also provided.

20 Claims, 13 Drawing Sheets

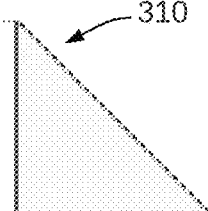

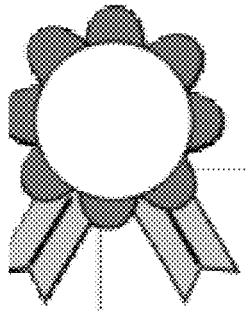

Domain Certificate

```
Data:
    Version: 3 (0x2)
    Serial Number:
        72:bc:a8:50:65:4c:c2:3d:44:df:3b:b8:d6:d7:ba:69
    Signature Algorithm: ecdsa-with-SHA384
    Issuer: C = CH, ST = Vaud, L = Lausanne, O = root        ← 312
    Validity
        Not Before: Jun 25 07:59:20 2020 GMT
        Not After : Jun 25 07:59:20 2021 GMT
    Subject: C = CH, ST = Vaud, L = Lausanne,
    O = kudelskisecurity, CN = kudelskisecurity.example.com
    Subject Public Key Info:
        Public Key Algorithm: id-ecPublicKey
            Public-Key: (384 bit)
            pub: *public_key*
            ASN1 OID: secp384r1
            NIST CURVE: P-384
    X509v3 extensions:
        X509v3 Key Usage: critical
            Digital Signature, Certificate Sign
        X509v3 Extended Key Usage:
            TLS Web Client Authentication, TLS Web Server Authentication
        X509v3 Basic Constraints: critical
            CA:TRUE
    Signature Algorithm: ecdsa-with-SHA384
        *signature*
```

FIG. 3B

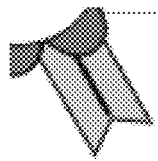
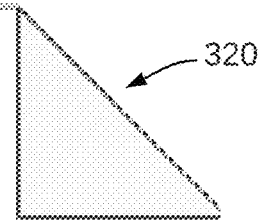

User Certificate — 320

Data:
  Version: 3 (0x2)
  Serial Number:
    31:5b:14:54:f5:e5:af:69:f4:f4:19:5d:db:36:ed:b2
  Signature Algorithm: ecdsa-with-SHA384
  Issuer: C = CH, ST = Vaud, L = Lausanne,
  O = kudelskisecurity, CN = kudelskisecurity.example.com
  Validity
    Not Before: Jun 25 08:16:52 2020 GMT
    Not After : Jun 25 08:16:52 2021 GMT
  Subject: C = CH, ST = Vaud, L = Lausanne,
  O = kudelskisecurity, CN = kudelskisecurity.example.com,
  2.0.0.42 = 0x5C78aED6051cDd72D486bF4Bb929ACFC9D116c4f
  Subject Public Key Info:
    Public Key Algorithm: id-ecPublicKey
      Public-Key: (384 bit)
      pub: \*\*\*public_key\*\*\*
      ASN1 OID: secp384r1
      NIST CURVE: P-384
  X509v3 extensions:
    X509v3 Key Usage: critical
      Digital Signature
    X509v3 Extended Key Usage:
      TLS Web Client Authentication, TLS Web Server Authentication
    X509v3 Basic Constraints: critical
      CA:FALSE
Signature Algorithm: ecdsa-with-SHA384
   \*\*\*signature

| Magic Number | max_size | block_size | server_directory | inode table | data |
|---|---|---|---|---|---|
| 0 | 4 | 8 | 12 | 30 | max_size / 6 + 32 ... max_size |

FIG. 6A

| index | type | flags | footprint | policy_version | policy | version | data | contract | owner₁ | ... | ownerₙ |
|---|---|---|---|---|---|---|---|---|---|---|---|
| 0 | 4 | 5 | 9 | 41 | 45 | 53 | 57 | 65 | 85 | 105 | 235 ... 255 |

FIG. 6B

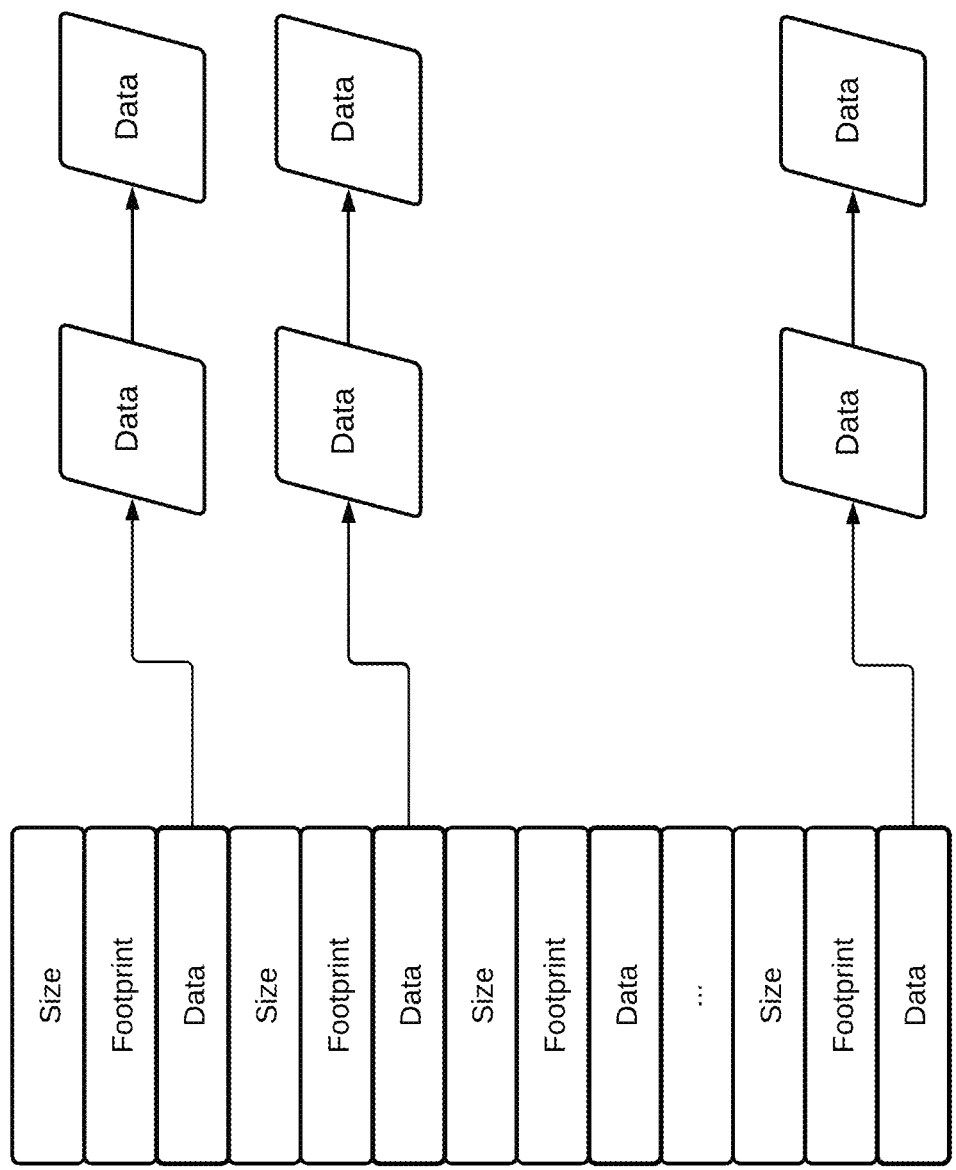

BLOCKCHAIN MANAGED ACCESS SYSTEM

FIELD OF THE DISCLOSURE

The present disclosure relates generally to data access control solutions. In particular, techniques (e.g., systems, methods, and devices) are provided to implement a secure and distributed file storage scheme and in particular, a managed access system that is using a blockchain.

BACKGROUND OF THE DISCLOSURE

Collaboration and data sharing are essential to innovation. Be it research data, business related data or user data, sharing helps build models to better understand the world around us. However, collaboration can become difficult depending on the type of data. For example, clinical data can be useful for evaluating disease risk, but free access to such data can cause privacy concerns. For similar reasons, government data are often subject to compliance policies that prevents open access.

In some cases, data sharing can be limited because of the lack of incentive to publish. A famous adage in academia is "publish or perish," illustrating the relation behind the number of papers published and career prospects. As a result, there exist tendencies amongst researchers to withhold data, which consequently slows the innovation process.

SUMMARY

Aspects of the disclosed technology address the foregoing limitations by providing solutions for facilitating data sharing using a blockchain managed access system (BMAS). In some aspects, a BMAS can provide a distributed and versioned file system that includes a security layer to provide security guarantees using a blockchain in complement of authentication, access control, and encryption. In some implementations, the BMAS can be implemented such that authentication, access control and encryption functions are parameterized to depend on the needs of specific clients and/or users.

Certain embodiments of the present disclosure include a system. The system may include one or more data processors; and one or more non-transitory computer-readable storage media containing instructions that, when executed on the one or more data processors, cause the one or more data processors to perform the methods described above and herein. In some aspects, the processors can be configured to perform operations including: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

Certain embodiments of the present disclosure include a method. The method may include operations for managing a distributed file storage system. In some aspects, the method can include operations for: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

Certain embodiments of the present disclosure include a computer-program product tangibly embodied in a non-transitory machine-readable storage medium, including instructions configured to cause a data processing apparatus to perform the methods described above and herein. In some aspects, the instructions can be configured for causing a computer or processor to perform operations for: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIGS. 3A-3C illustrate examples of certificates that can be issued to enable entity (domain) or user access to a blockchain managed access system (BMAS), according to some aspects of the disclosed technology;

FIGS. 6A and 6B illustrate example I-Node structures that can be implemented by a blockchain managed access system (BMAS), according to some aspects of the disclosed technology;

FIGS. 7A and 7B illustrate conceptual block diagrams of an example versioning schema that can be implemented by a blockchain managed access system (BMAS), according to some aspects of the disclosed technology;

DETAILED DESCRIPTION

Figure 1:
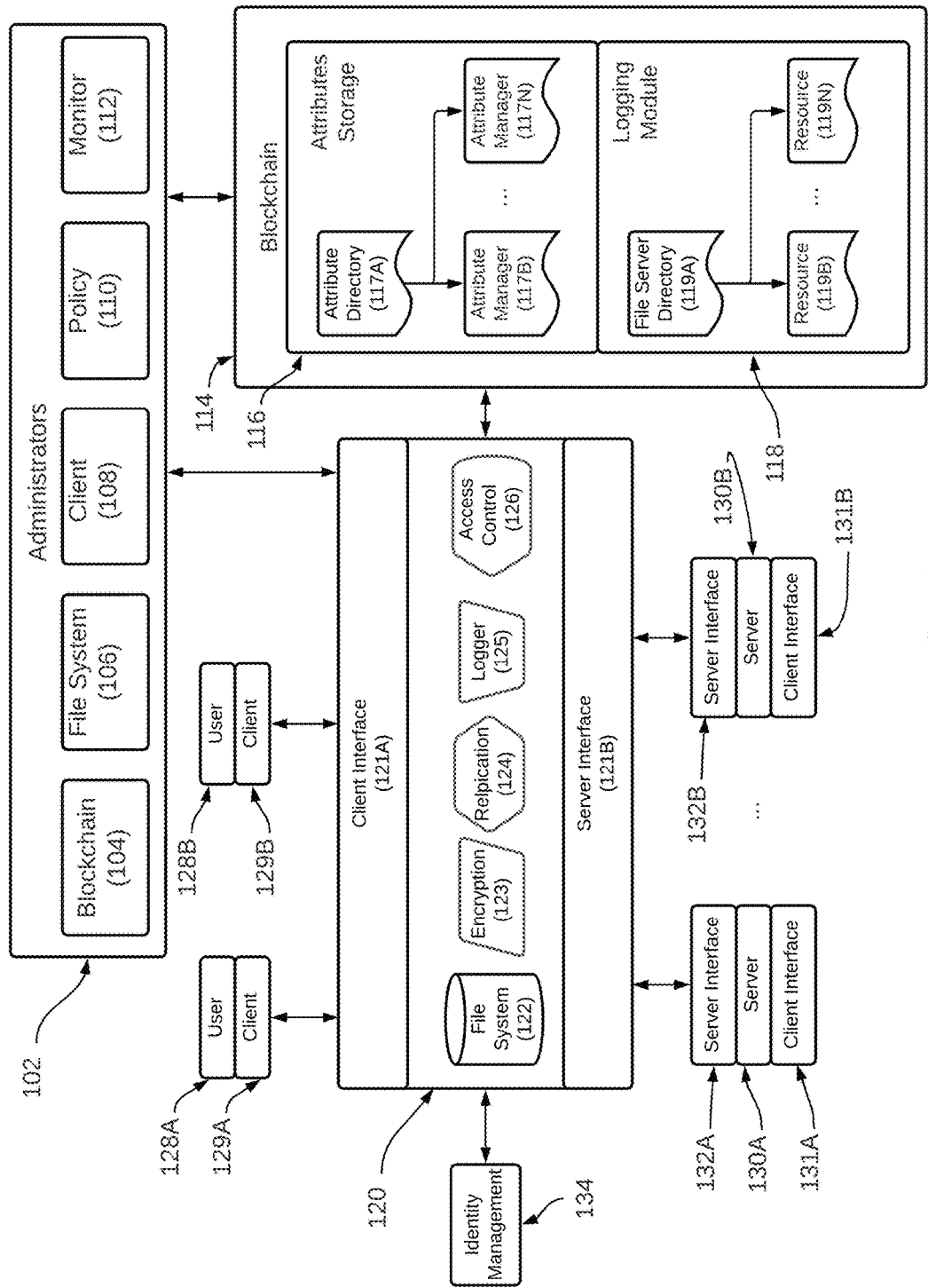
FIG. 1 shows a block diagram of an example blockchain managed access system (BMAS), according to some aspects of the disclosed technology.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Recent developments in distributed consensus technologies have improved file sharing capabilities beyond what was afforded by conventional centralized datacenters. Some such file sharing technologies, such as the Interplanetary File System (IPFS), utilize distributed ledgers to distribute file storage and to validate data integrity, e.g., using content identifiers (CIDs). However, these distributed storage solutions do not support data sharing, or provide access control capabilities. As such, conventional distributed file sharing solutions, such as IPFS, do not provide tractable storage or management solutions in scenarios where sensitive or private information needs to be shared between select entities (domains) and/or individual (users).

Aspects of the disclosed technology address the foregoing limitations by providing a managed access system that utilizes distributed consensus guarantees (e.g., using a blockchain) to ensure trust between data-sharing participants. In some aspects, participant identities are validated using a certificate-based trust chain. For example, the certificate chain can be used to validate the identities of participating entities (e.g., domains and/or organizations), as well as individuals (users) within each domain.

Once participant identities have been established, file sharing between validated domains/users can be accomplished using homomorphic encryption schema in which data are encoded using key shares associated with different parties. Using such schema, access to protected data can be limited to those entities/users that possess revokable permissions from all data stakeholders. In some implementations, data fidelity, including file versioning and access logs, can be accessible to all sharing participants by employing distributed consensus mechanisms, such as a blockchain, e.g., such as the Ethereum blockchain. Although specific distributed consensus mechanisms (e.g., Ethereum) are discussed herein with respect to the disclosed managed access system, it is understood that other blockchain types may be used. Additionally, other distributed consensus architectures, such as Directed Acyclic Graphs, are contemplated, without departing from the scope of the disclosed technology.

FIG. 1 shows a block diagram of an example blockchain managed access system 100 (BMAS), according to some aspects of the disclosed technology. As illustrated, the BMAS 100 includes an administrative layer 102, that includes various modules for managing different components of the BMAS 100. In the illustrated example, administrative layer 102 includes a blockchain module 104, a file system module 106, a client module 108, a policy module 110, and a monitor module 112. Each of the modules can be configured for allowing BMAS administrators to manage functions for the corresponding components. By way of example, blockchain module 104 can be configured to permit administrators to manage the storage of attribute and logging data to blockchain 114. File system module 106 can be configured to permit management of file storage by different clients. Client module 108 can be configured to manage clients such as entities (domains) and/or individuals (users) that are provided access to BMAS 100. Policy module 110 can be configured to permit administrators to implement/update various BMAS policies; and monitor module 114 can be configured to provide the ability to detect changes and monitoring various BMAS operations.

The administrative layer 102 is also coupled to a blockchain layer (blockchain) 114, that is configured to store various forms of data including file attributes and logging metadata. In the example of FIG. 1, blockchain 114 can be configured to store a variety of file attributes, e.g., in an attributes storage module 116 that can include an attribute hierarchy 117, for example, that includes an attribute directory 117A, and one or more attribute managers 117B-N. In some aspects, the attribute hierarchy 117 can function to store a permanent and distributed records of file (attribute) metadata, and to record versioning information, such as file changes, etc.

In some examples, blockchain 114 can also be configured to store logging metadata, e.g., in a logging module 118. In some implementations, logging module 118 can be configured to store and track data resources, for example, using one or more file servers 119 that include a corresponding file server directory 119A, that is configured to map one or more resources, e.g., resource 119B-119N. It is understood that various other types of data (e.g., file and/or user metadata) can also be stored to blockchain 118. As discussed above, blockchain 114 can be, or can include, an Ethereum blockchain. However, the use of other blockchain types are contemplated. Additionally, it is understood that blockchain 114 can include a private blockchain, a public blockchain, a consortium blockchain and/or a hybrid blockchain, without departing from the scope of the disclosed technology.

As illustrated in the example of FIG. 1, the administrative layer 102 and blockchain 114 are also coupled to a management layer 120 that includes one or more servers for hosting a bundle of management resources, including a file system 122, an encryption module 123, a replication module 124, a logger 125 and an access control module 126. In some examples, access control module 126 can be configured to support the definition of fine-grain policies restricting access to the data stored in the file system 122. The replication module 124 can be configured to expose an interface for fine-grain replication of the resource (files). Finally, the encryption module 123 can be configured to implement a collaborative encryption scheme (e.g., a homomorphic encryption scheme) that can be used to securely store the data.

In operation, the file system 122 and various modules (123, 124, 125, 126) of management layer 120 can be configured for direct exposure to one or more users/clients via a client interface 121A. For example, client interface 121A can be configured to communicate with various client devices (e.g., processor-based network devices), 129 that are associated with one or more users. In the example of FIG. 1, two client devices (129A, 129B) are illustrated, with corresponding users 128A and 128B (respectively); however, it is understood that a greater (or fewer) number of client devices may be configured for direct communication with management layer 120, without departing from the scope of the disclosed technology. Additionally, management layer 120 can be configured for direct communication with one or more servers 130 (e.g., servers 130A, 130B) via a server interface 121B of the management system 120. In some examples, server interface 121B of management system 120 can be configured for direct communication with a server interface 132, of a communicating external server 130. Servers 130, in turn, can also provide user access capabilities, for example, via a client interface 131. In the illustrated example, servers 130A and 130B can communicate directly with management system 120 via their own respective interfaces (132A, 132B), as well as directly with users via their respective client interfaces (131A, 131B). Although only two external servers (130A, 130B) are illustrated, it is understood that a greater (or fewer) number of external servers may communicate with management system 120, without departing from the scope of the disclosed technology.

Identity management for any entity (server/domain) and/or user communicating with management system 120 can be controlled/administered by using an identity management system 134. In operation, identity management system 134 can manage the creation and distribution of domain and/or user certificates that can be used to control identity validation for each actor with access to management system 120. Identity validation can help guard against specific security threat vectors, such as man-in-the-middle attacks, spoofing attacks, and the like. Additional details regarding the use of certificates to perform actor identity attribution are discussed in further detail with respect to FIG. 2A and FIG. 2B.

Figure 2A:
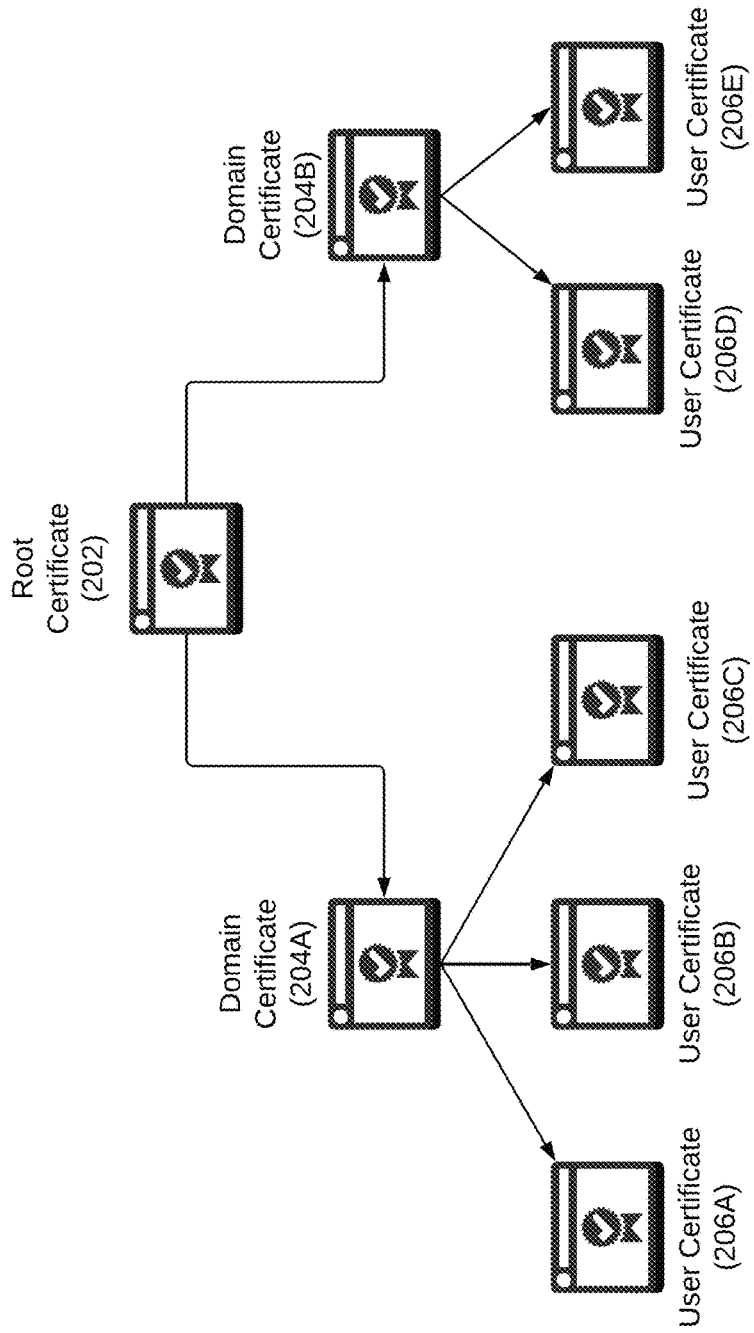
FIG. 2A shows a conceptual diagram of a certificate hierarchy that can be used to facilitate identity management by a blockchain managed access system (BMAS), according to some aspects of the disclosed technology.

FIG. 2A shows a diagram of an example certificate hierarchy 200 that can be implemented by a blockchain managed access system (BMAS), such as BMAS 100, discussed above. At the apex of certificate hierarchy 200 is a root certificate 202, which can represent the first certificate that is created/issued by the BMAS. In some implementations, the validity of root certificate 202 must be agreed upon by all participating parties/entities in the BMAS system, such as administrators in the setup of the certificate hierarchy 200.

In some examples, the root certificate 202 can be used to derive one or more domain certificates 204, for example, for each entity/domain actor affiliated with the BMAS. In the example of FIG. 2A, two domain certificates (204A, 204B) are derived from root certificate 202; however, it is understood that a greater (or fewer) number of domain certificates can be generated, without departing from the scope of the disclosed technology. In practice, domain certificates and the associated domain names, can be used to disambiguate queries and identity where resources are stored, e.g., within a file system, such as file system 122, discussed above. Additionally, domain certificates can be used by the respectively associated entities (e.g., organizations, companies, or network domains) to create/add new users. By way of example, domain certificates 204 can be used to derive one or more user certificates 206 that can be used to identify/validate individual users associated with a given domain. By enabling the derivation of user certificates 206 from domain certificates 204, users can be added to the BMAS trusted setup without the need for a centralized validating authority. As with domain certification, the user certificates 206 can be used to log user access to specific resources, e.g., on a blockchain, such as blockchain 214 discussed above with respect to FIG. 1.

For BMAS implementations that use an Ethereum blockchain, every participant can be associated with a public/private key pair that can be used to sign each transaction. In some implementations of the Ethereum blockchain, this pair can be generated using an elliptic curve, such as, secp256k1 and the signing algorithm can be an Elliptic Curve Digital Signature Algorithm (ECDSA). In some examples, every user (as well as every contract) deployed on the blockchain can be associated with a unique address that is computed based on the user's respective public key. However, while an address is bound to a unique user, the Ethereum blockchain does not link the address to a given user without the user voluntarily revealing his identity.

In some approaches, in order to provide user identification within the BMAS, the user certificates 206 can be configured to use the same curve as the one used in Ethereum (e.g., secp256k1), thereby resulting in a unified identity. In some implementations, a different curve can be used while augmenting the certificate with new information corresponding to the public key used by the user on the blockchain. While this implies having two key pairs, instead of one, in some approaches both sets of information can be stored in the same certificate and same key file by using different PEM blocks.

Figure 2B:
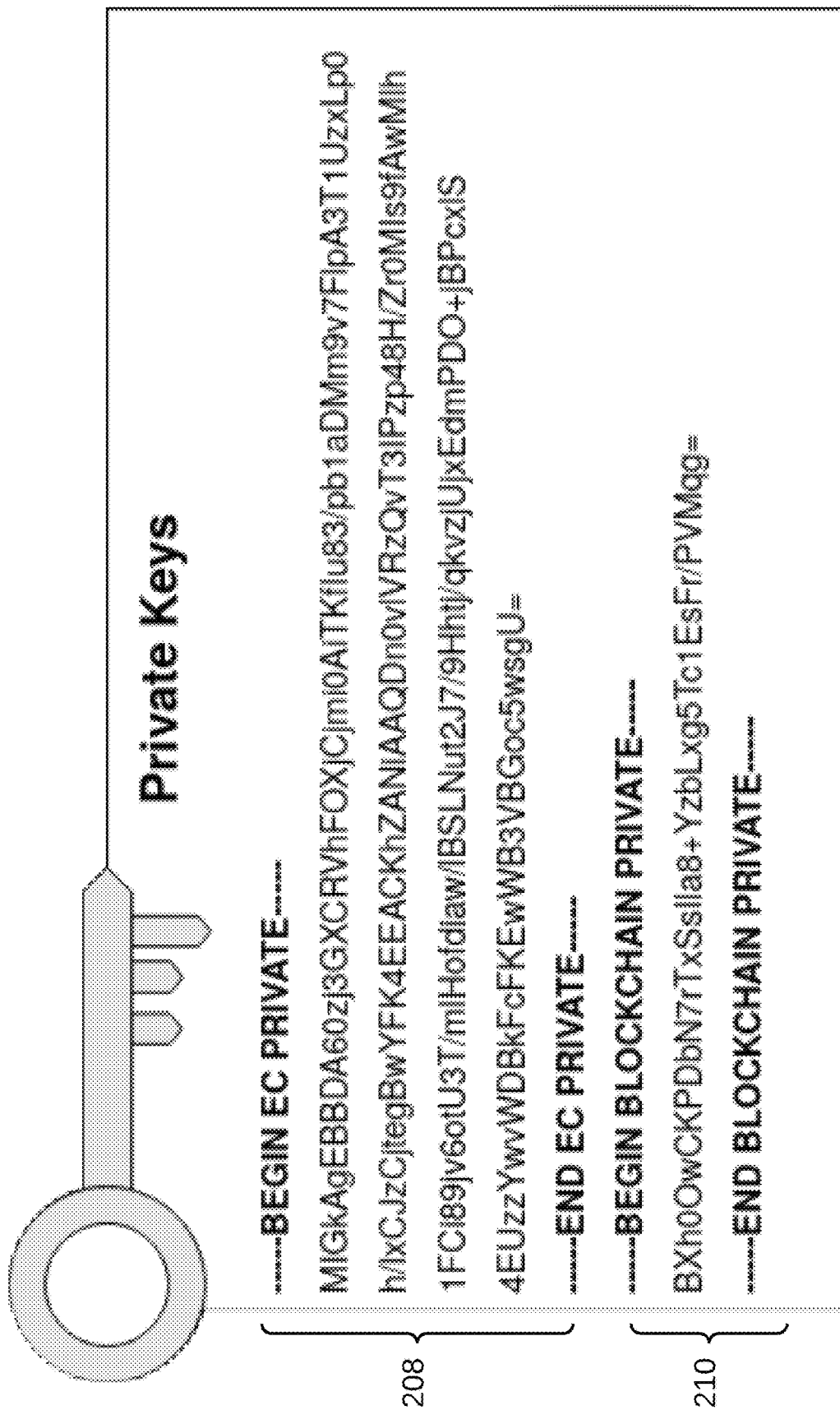
FIG. 2B illustrates an example of a private key that can be used to facilitate interaction with a blockchain portion of a blockchain managed access system (BMAS), according to some aspects of the disclosed technology.

FIG. 2B illustrates an example of a private key formed from two PEM blocks. In this example, the first block 208 corresponds to the private key of the certificate, while the second block 210 corresponds to the private key for the blockchain.

Figure 3A:
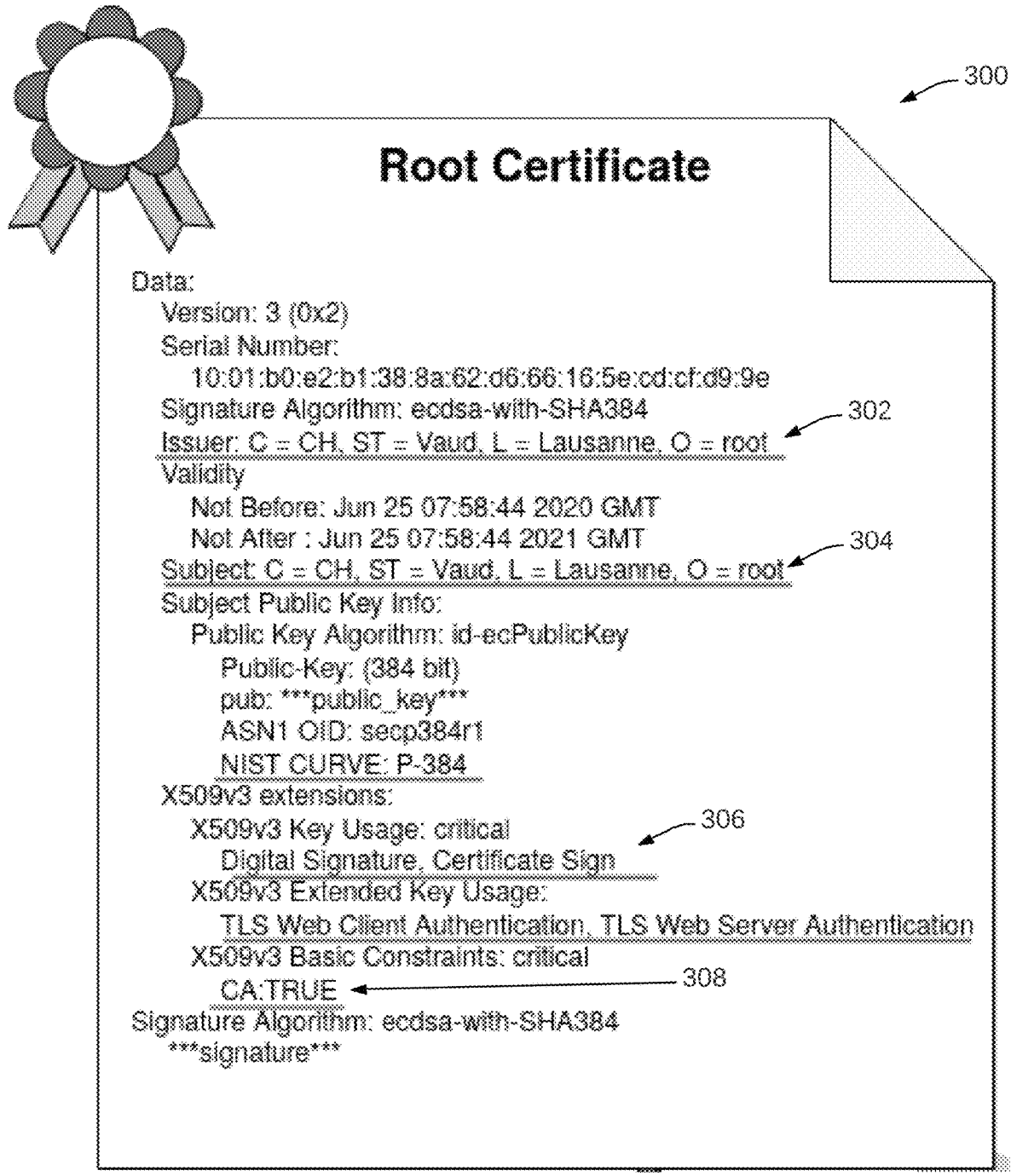

FIGS. 3A-3C illustrate examples of certificates that can be issued to enable entity (domain) or user access to a blockchain managed access system (BMAS), according to some aspects of the disclosed technology. In particular, FIG. 3A illustrates an example of a root certificate (or root contract) 300, where it can be observed that the issuer field 302 and subject field 304 are the same. In this example, the root certificate 300 is self-signed as it is the root of the trust chain, for example, corresponding with root certificate 202, discussed above with respect to FIG. 2A. Additionally, in this example, the root certificate 300 is limited in use, e.g., to digitally sign data, as specified by the 'Key Usage' field 306. Furthermore, in this example, the root certificate 300 is allowed to act as a CA (certification authority) contract, as specified by CA field 308.

FIG. 3B illustrates an example of a domain certificate (or domain contract) 310 that has been derived from the root certificate 300. In this example, domain certificate 310 contains an issuer field 312 matching the data of the root contract, indicating its derivation source.

FIG. 3C illustrates an example of a user certificate 320. In the example of FIG. 3C, domain user certificate 320 is derived from domain certificate 310, as indicated by issuer field 322.

Figure 4:
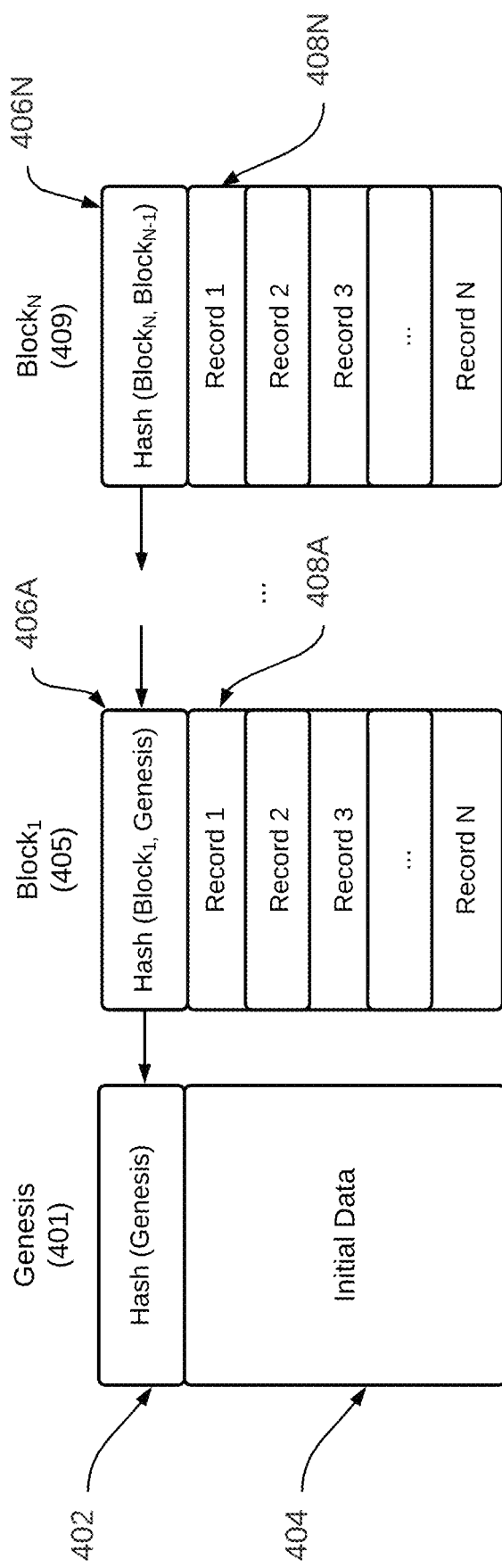
FIG. 4 shows a block diagram of an example blockchain that can be implemented by a blockchain managed access system (BMAS), according to some aspects of the disclosed technology.

FIG. 4 shows a block diagram of an example blockchain 400 that can be implemented by a blockchain managed access system (BMAS), according to some aspects of the disclosed technology. As used herein, blockchain 400 is a distributed storage system composed a ledger for storing data and a way of replicating it. In operation, the ledger can utilize a hash tree (or Merkle tree), where every node contains, along with the data that it stores, a hash composed of the hashes of its intervening blocks. In the context of the blockchain, a node is often referred to as a block.

In the example, of blockchain 400 the initial node or block, e.g., genesis block 401, includes a hash portion 402, and a ledger portion 404 containing some initial data. As illustrated, the subsequent block, e.g., Block$_1$ 405 contains ledger data 408A (e.g., Records 1-N), and is linked to the genesis block 401 via hash 406A. Subsequent blocks are similarly linked in a daisy-chain structure, back to the genesis block 401. New blocks are added as transactions are issued on the blockchain 400, with a current block represented as Block$_N$ 409, which is added to the chain via has 406N, and contains its own transaction record data 408N.

In practice, the blocks of the blockchain 400 (containing ledger data) are replicated amongst nodes such that each node can have a complete replica of the block chain. To achieve the replication, the blockchain can utilize a consensus algorithm. Several types of algorithms exist and can be used depending on the assumptions made on the system as well as the guarantees desired. Once the ledger has been replicated, any actor in the system can verify its integrity and validity by validating the hashes.

Some blockchain implementations sacrifice consistency, and as such, must have mechanisms to provide partition tolerance and availability to guarantee that transactions terminate or converge. In such implementations, one consequence of the partition is known as a fork, e.g., when two valid blocks are committed at the same time. This results in some nodes adopting one block while others adopt a different block, thereby yielding two (or more) different views of the blockchain. Many blockchain implementations have a policy to resolve this kind of problem by always following the longest chain. This means that the next block that will be committed will be appended to one of the two existing blocks, say block B1. When this happens, the participants following the chain with block B2 detect the addition of the new block and switch to the other branch. The blocks that are not part of the chain can be discarded or sometime used for other purposes. They are sometimes called uncle blocks and they give the ledger its tree form.

Forks and rollbacks can have serious implications if off-chain decisions are made based on the current state of the blockchain. For example, the data stored in block B2 that do not exist in the block B1 can be lost. To address this concern, in some implementations the BMAS can authorize a user to access a file based on a value stored in the blockchain.

In some aspects, the blockchain can be used to implement various contracts (e.g., smart contracts) within the BMAS. By way of example, the Ethereum blockchain can be used to support smart contracts that are used to implement several functions of the BMAS, including but not limited to: a file server directory (FileServerDirectory) contract, an attribute directory (AttributeDirectory) contract, a resource contract, and/or an attribute manager (AttributeManager) contract.

In some examples, the file server directory contract can be configured to provide a record of the information of the file servers participating in the system. In some aspects, the file server directory contract can be deployed once when the system is configured and each server and client is configured to reference it. The file system directory contract can be initially deployed with a list of addresses corresponding to the administrators of the system along with the domain to which they are associated.

In some implementations, the BMAS can use an attribute-based access control model in order to allow each party to easily define new attributes without requiring central administration. The attributes can be stored into the blockchain. By doing so, the attributes are transparent, available, consistent and tamper resistant. In some examples, the attribute directory contract can be deployed once when the system is configured. For example, its address can be configured inside every file server and client instance. The attribute-based access control model can act as the entry point when fetching the value of an attribute for a given user and it can be responsible for deploying the attribute manager contract. In turn, the attribute manager contract is configured to allow a user to define attributes for which he becomes the administrator.

In some examples, a resource contract is used to represent an existing Inode, i.e., that represents either a file or a directory that exists in the file system. For every existing Inode, the file server on which it was created can deploy a resource contract. In some aspects, the resource contract can be used to implement logging and paid access functions.

Figure 5:
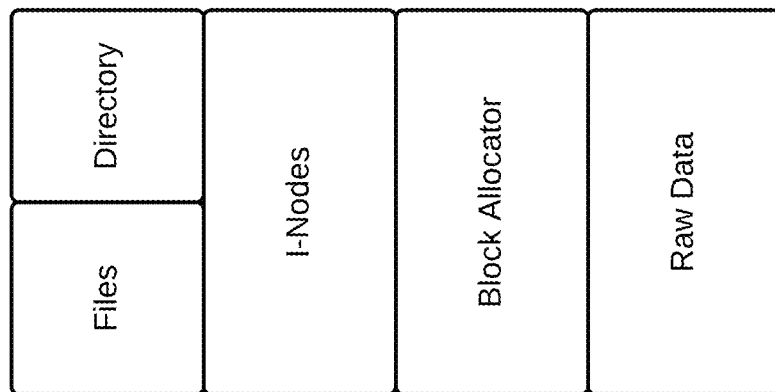
FIG. 5 shows a block diagram of an example file system that can be implemented by a blockchain managed access system (BMAS), according to some aspects of the disclosed technology.

FIG. 5 shows a block diagram of an example file system 500 that can be implemented by a blockchain managed access system (BMAS), according to some aspects of the disclosed technology. In some implementations, the file system can be stored in a single file on an existing file system. In addition to improving portability, this design allows for faster prototyping, avoiding the necessity to re-implement low-level primitives needed for resource allocation and management.

FIGS. 6A and 6B illustrate example file system structures that can be used to implement a file system, such as file system 500, discussed above. In particular, FIG. 6A illustrates an example Inode structure. In this example, the magic number field can be used to store an arbitrarily chosen integer, for example, that is used to identify that the file stores a file system. In some implementations, this number does not provide any integrity checks, and may only be used to detect the corresponding file format.

The max size field can be used to store an indicator of the maximum size of the file system. The block size field can be used to indicate a minimum unit of allocation. Finally, the server directory field contains the address of the file server directory, discussed above. Any allocation made in the file system can be made in terms of blocks of fixed size. This has multiple advantages over other approaches, like contiguous allocation. First, it allows for simplified space management, for example, by using a bitmap structure to keep information on free and used blocks. It also provides the ability to increase the originally allocated space. Finally, it also helps to avoid external fragmentation and to support memory reorganization algorithms. The Inode table stores the information about all the Inodes in the file system. The size of this table, and consequently the number of Inodes available can be fixed at the creation of the file system. Finally, the space that follows the Inodes table contains the actual data.

FIG. 6B illustrates an example of an Inode structure. In the example of FIG. 6B, the Inode structure reflects a fixed size in order to facilitate storage and retrieval. In some approaches, with a fixed size, the Inode table can be loaded into an array and fetching an Inode amounts to retrieving the data stored at a given index in the array.

In some aspects, the index is a unique number given to identify the Inode. In some implementations, this can be defined as the position of the Inode in the table. The type can be used to determine if it is a file (0) or a directory (1). In some examples, both type of resources can have the same metadata. The flags are a set of bits representing attributes associated with the Inode. In some approaches, attributes can fall into two categories, file system private or public. The first category can define flags that are used internally by the file system and should not be exposed to the user.

Figure 7A:
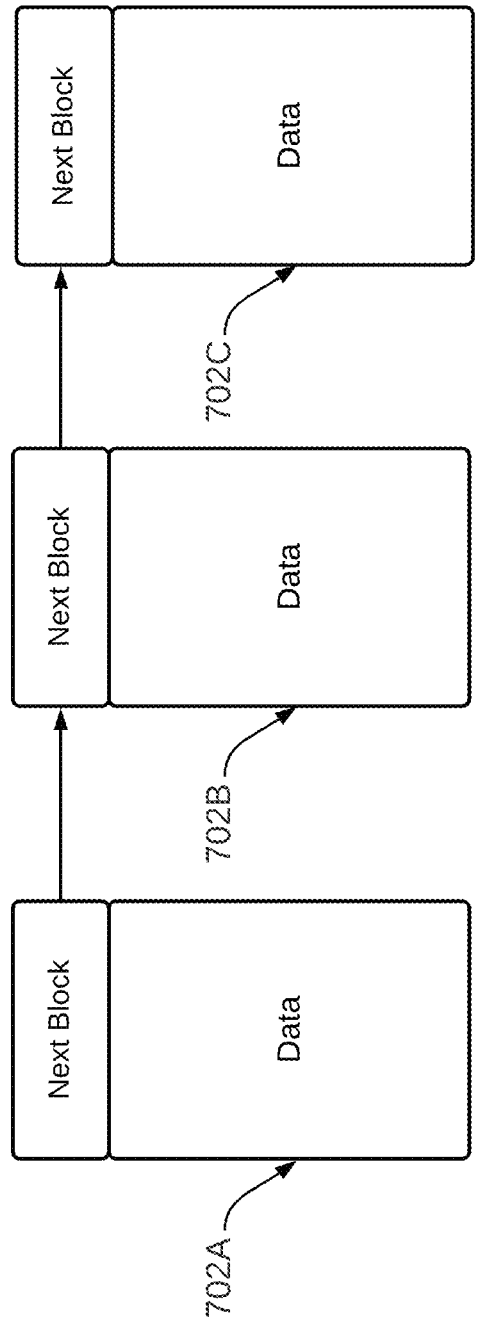

FIGS. 7A and 7B illustrate conceptual block diagrams of an example versioning schema that can be implemented by a blockchain managed access system (BMAS), according to some aspects of the disclosed technology. In some implementations, the BMAS file system can be configured to perform built-in versioning of both of data and policies. That is, changes or updates to file versioning and/or policy information can be stored to a distributed ledger, such as blockchain 114, discussed above with respect to FIG. 1. In the example of FIG. 7A, the data field 702 directly stores the address of the previous data block. For example, data block 702A references data block 702B, which references data block 702C, etc. The data addressed by the data field is a block that contains the structure presented in FIG. 7B. Therefore, a version is a tuple (size, footprint, data) where size is the actual size of the data, data is the address of the data block and footprint is a digest computed according to the relationship of equation (1):

$$\text{Foot Print}(\text{version}_i) = \text{Sha256}(\text{Foot Print}(\text{version}_{i-1}, \text{Sha256}(\text{data}))) \quad (1)$$

In some implementations, computing the footprint in this manner creates a hash chain that can be used to verify that past versions were not tempered with.

Figure 8:
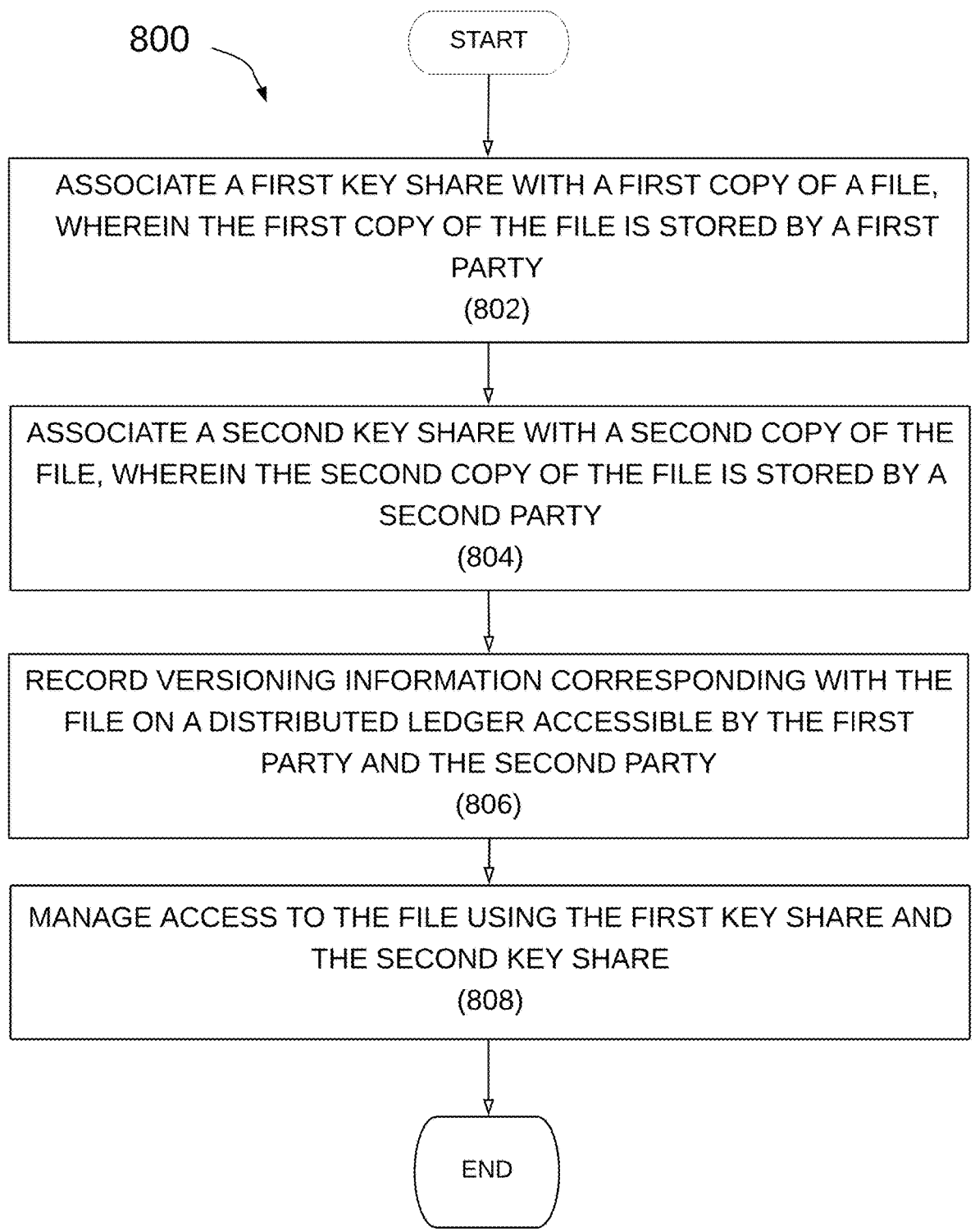
FIG. 8 illustrates a block diagram of an example process for implementing file sharing using a blockchain managed access system (BMAS), according to some aspects of the disclosed technology.

FIG. 8 illustrates a block diagram of an example process 800 for implementing a file sharing process using a blockchain managed access system (BMAS), according to some aspects of the disclosed technology. At operation 802, the process 800 includes associating a first key share with a first copy of a file. In some aspects, the first key share can be associated with a specific party (e.g., a first party), such as a domain or user of the BMAS. Additionally, in some aspects, the first copy of the file can be stored/hosted by the first party, such as by being stored on a system for which access/data-retrieval is controlled by the first party, such as a server associated with an organization corresponding with the first party.

At operation 804, process 800 includes associating a second key share with a second copy of the file, wherein the second copy of the file is stored (or hosted) by a second party. Similar to the first file, the second file can be hosted on a system (server) that is controlled by the second party.

At operation 806, versioning information corresponding with the file is recorded (stored) on a distributed ledger that is accessible by the first party and the second party. As discussed above, the distributed ledger can be a blockchain, such as a private Ethereum blockchain. By storing versioning information for the file to the blockchain, all parties with access to the data contained in the file (e.g., the first party and the second party) can validate the file version and/or changes to the file that may be made by one or more other parties.

At operation 808, the process 800 can include managing access to the file using the first key share and the second key share. In some approaches, each of the key share portions may be needed by any one party to decrypt/access the data contained in any of the stored copies. By way of example, access to the file (e.g., either the first or second copy of the file) by the first party may require that the first party obtain possession of the first key share and the second key share. As such, the first party's ability to access to the file can be controlled by the second party. In a similar manner, access to any file copy by the second party can require that the second party first obtain the first and second key shares. In some implementations, the distributed storage/hosting of the file (e.g., by a BMAS) may be secured using a homomorphic encryption scheme. However, other encryption schemes may be implemented, without departing from the scope of the disclosed technology.

Figure 9:
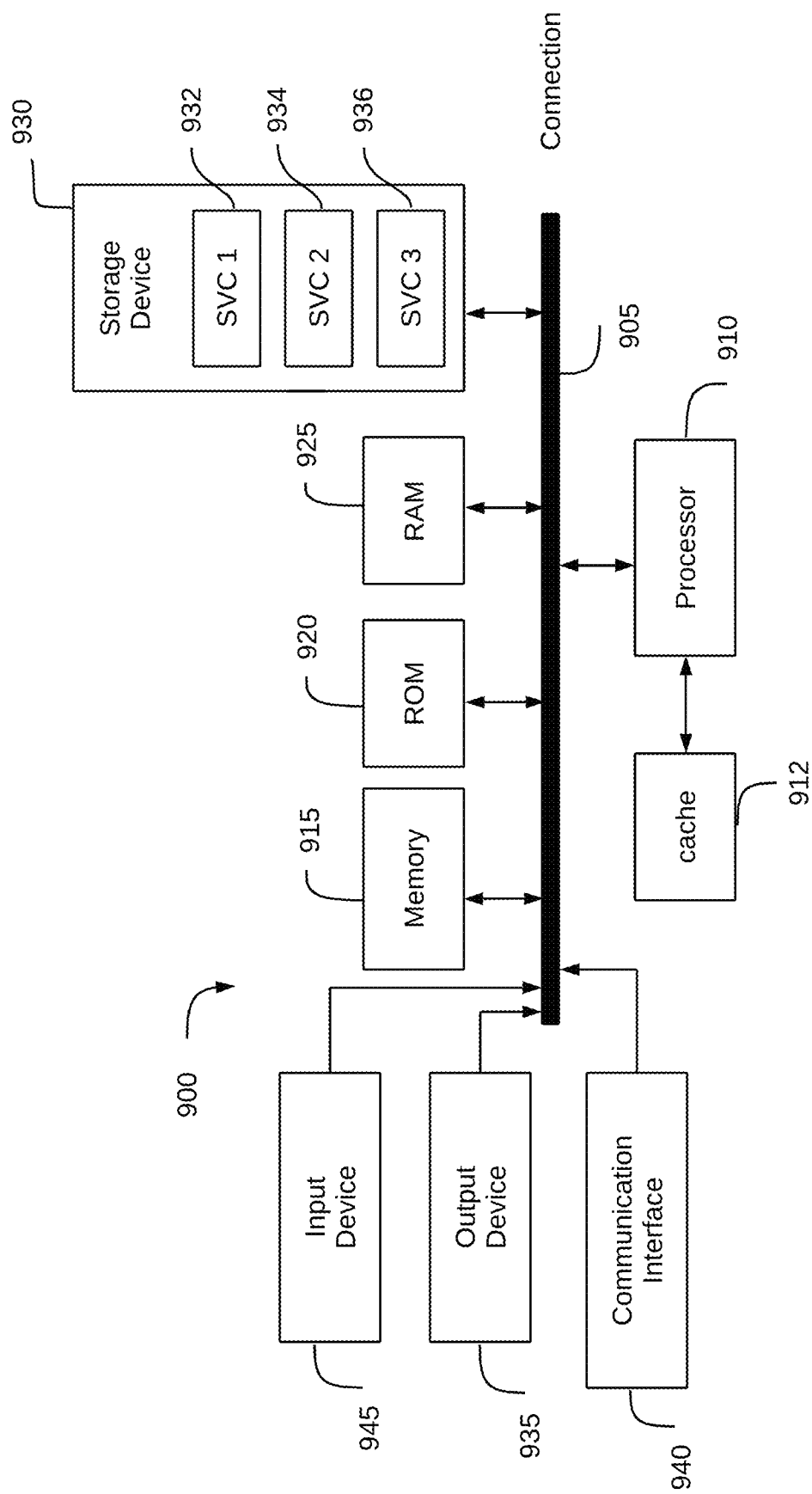
FIG. 9 is a block diagram illustrating an example of a computing system architecture, in accordance with some examples.

FIG. 9 is a block diagram illustrating an example of a computing system architecture, in accordance with some examples. In some examples, the processes described herein (e.g., process 800 and/or other process described herein) may be performed by a computing device or apparatus. In one example, the process 800 can be performed by the blockchain managed access system (BMAS) described herein. In another example, the process 800 can be performed by a computing device with the computing system 900 shown in FIG. 9. The computing device can include any suitable device, such as a mobile device (e.g., a mobile phone), a desktop computing device, a tablet computing device, a wearable device, a server computer, a television, and/or any other computing device with the resource capabilities to perform the processes described herein, including the process 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the operations/steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an architecture of a computing system 900 wherein the components of the system 900 are in electrical communication with each other using a connection 905, such as a bus. Exemplary system 900 includes a processing unit (CPU or processor) 910 and a system connection 905 that couples various system components including the system memory 915, such as read only memory (ROM) 920 and random*access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general-purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable client interaction with the computing system 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a client to provide multiple types of input to communicate with the computing system 900. The communications interface 1040 can generally govern and manage the client input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the concepts in this disclosure may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" or "one or more of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

Example 1: An access control system including: one or more processors; and one or more non-transitory machine-readable storage media containing instructions that, when executed on the one or more processors, cause the one or more processors to perform operations including: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

Example 2: A system according to Example 1, wherein managing access to the file further includes: receiving an access request from a user associated with the first party, wherein the access request is based on a domain certificate associated with the first party; validating an identity of the user based on the access request; and recording the access request from the user on the distributed ledger.

Example 3: A system according to any of Examples 1 or 2, wherein the user is associated with a user certificate, and wherein the user certificate is based on the domain certificate.

Example 4: A system according to any of Examples 1 to 3, wherein managing access to the file further includes: granting the first party access to the file if the first key share and the second key share are both provided by the first party; and recording the first party's access of the file on the distributed ledger.

Example 5: A system according to any of Examples 1 to 4, wherein managing access to the file further includes: denying the first party access to the file if the first key share and the second key share are not both provided; and recording the first party access denial on the distributed ledger.

Example 6: A system according to any of Examples 1 to 5, wherein the distributed ledger is a blockchain.

Example 7: A system according any of Examples 1 to 6, wherein the blockchain is an Ethereum blockchain.

Example 8: A computer-implemented method for managing a distributed file storage system, including: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

Example 9: A computer-implemented method according to Example 8, wherein managing access to the file further includes: receiving an access request from a user associated with the first party, wherein the access request is based on a domain certificate associated with the first party; validating an identity of the user based on the access request; and recording the access request from the user on the distributed ledger.

Example 10: A computer-implemented method according to any of Examples 8 to 9, wherein the user is associated with a user certificate, and wherein the user certificate is based on the domain certificate.

Example 11: A computer-implemented method according to any of Examples 8 to 10, wherein managing access to the file further includes: granting the first party access to the file if the first key share and the second key share are both provided by the first party; and recording the first party's access of the file on the distributed ledger.

Example 12: A computer-implemented method according to any of Examples 8 to 11, wherein managing access to the file further includes: denying the first party access to the file if the first key share and the second key share are not both provided; and recording the first party access denial on the distributed ledger.

Example 13: A computer-implemented method according to any of Examples 8 to 12, wherein the distributed ledger is a blockchain.

Example 14: A computer-implemented method according to any of Examples 8 to 13, wherein the blockchain is an Ethereum blockchain.

Example 15: A non-transitory computer-readable storage medium including at least one instruction for causing a computer or processor to perform operations for: associating a first key share with a first copy of a file, wherein the first copy of the file is stored by a first party; associating a second key share with a second copy of the file, wherein the second copy of the file is stored by a second party; recording versioning information corresponding with the file on a distributed ledger accessible by the first party and the second party; and managing access to the file using the first key share and the second key share.

Example 16: A non-transitory computer-readable storage medium according to Example 15, wherein managing access to the file further includes: receiving an access request from a user associated with the first party, wherein the access request is based on a domain certificate associated with the first party; validating an identity of the user based on the access request; and recording the access request from the user on the distributed ledger.

Example 17: A non-transitory computer-readable storage medium according to any of Examples 15 to 16, wherein the user is associated with a user certificate, and wherein the user certificate is based on the domain certificate.

Example 18: A non-transitory computer-readable storage medium according to any of Examples 15 to 17, wherein managing access to the file further includes: granting the first party access to the file if the first key share and the second key share are both provided by the first party; and recording the first party's access of the file on the distributed ledger.

Example 19: A non-transitory computer-readable storage medium according to any of Examples 15 to 18, wherein managing access to the file further includes: denying the first party access to the file if the first key share and the second key share are not both provided; and recording the first party access denial on the distributed ledger.

Example 20: A non-transitory computer-readable storage medium according to any of Examples 15 to 19, wherein the distributed ledger is a blockchain.

What is claimed is:

1. An access control system, comprising:
one or more processors; and
one or more non-transitory machine-readable storage media containing instructions that, when executed on the one or more processors, cause the one or more processors to perform operations including:
associating a first key share with a first copy of a file, wherein the first copy of the file is stored by a first party;
associating a second key share with a second copy of the file, wherein the second copy of the file is stored by a second party;
computing a hash chain for the first copy of the file using at least the second copy of the file;
determining versioning information corresponding with the file, the versioning information including at least the hash chain for the first copy of the file, data including an address of at least the first copy of the file, and a size of the data;
recording the versioning information corresponding with the file on a distributed ledger accessible by the first party and the second party for verifying one or more previous copies of the file; and
managing access to the file using the first key share and the second key share.

2. The system of claim 1, wherein managing access to the file further comprises:
granting the first party access to the file if the first key share and the second key share are both provided by the first party; and
recording the first party's access of the file on the distributed ledger.

3. The system of claim 1, wherein managing access to the file further comprises:
denying the first party access to the file if the first key share and the second key share are not both provided; and
recording the first party access denial on the distributed ledger.

4. The system of claim 1, wherein the distributed ledger is a blockchain.

5. The system of claim 4, wherein the blockchain is an Ethereum blockchain.

6. The system of claim 1, wherein managing access to the file further comprises:
receiving an access request from a user associated with the first party, wherein the access request is based on a domain certificate associated with the first party;
validating an identity of the user based on the access request; and
recording the access request from the user on the distributed ledger.

7. The system of claim 6, wherein the user is associated with a user certificate, and wherein the user certificate is based on the domain certificate.

8. A computer-implemented method for managing a distributed file storage system, comprising:
associating a first key share with a first copy of a file, wherein the first copy of the file is stored by a first party;
associating a second key share with a second copy of the file, wherein the second copy of the file is stored by a second party;
compute a hash chain for the first copy of the file using at least the second copy of the file;
determine versioning information corresponding with the file, the versioning information including at least the hash chain for the first copy of the file, data including an address of at least the first copy of the file, and a size of the data;
recording the versioning information corresponding with the file on a distributed ledger accessible by the first party and the second party for verifying one or more previous copies of the file; and
managing access to the file using the first key share and the second key share.

9. The computer-implemented method of claim 8, wherein managing access to the file further comprises:
granting the first party access to the file if the first key share and the second key share are both provided by the first party; and
recording the first party's access of the file on the distributed ledger.

10. The computer-implemented method of claim 8, wherein managing access to the file further comprises:
denying the first party access to the file if the first key share and the second key share are not both provided; and
recording the first party access denial on the distributed ledger.

11. The computer-implemented method of claim 8, wherein the distributed ledger is a blockchain.

12. The computer-implemented method of claim 11, wherein the blockchain is an Ethereum blockchain.

13. The computer-implemented method of claim 8, wherein managing access to the file further comprises:
receiving an access request from a user associated with the first party, wherein the access request is based on a domain certificate associated with the first party;
validating an identity of the user based on the access request; and
recording the access request from the user on the distributed ledger.

14. The computer-implemented method of claim 13, wherein the user is associated with a user certificate, and wherein the user certificate is based on the domain certificate.

15. A non-transitory computer-readable storage medium comprising at least one instruction for causing a computer or processor to:
associate a first key share with a first copy of a file, wherein the first copy of the file is stored by a first party;
associate a second key share with a second copy of the file, wherein the second copy of the file is stored by a second party;
compute a hash chain for the first copy of the file using at least the second copy of the file;
determine versioning information corresponding with the file, the versioning information including at least the hash chain for the first copy of the file, data including an address of at least the first copy of the file, and a size of the data;
record the versioning information corresponding with the file on a distributed ledger accessible by the first party and the second party for verifying one or more previous copies of the file; and
manage access to the file using the first key share and the second key share.

16. The non-transitory computer-readable storage medium of claim 15, wherein managing access to the file further comprises:

granting the first party access to the file if the first key share and the second key share are both provided by the first party; and recording the first party's access of the file on the distributed ledger.

17. The non-transitory computer-readable storage medium of claim 15, wherein managing access to the file further comprises:

denying the first party access to the file if the first key share and the second key share are not both provided; and recording the first party access denial on the distributed ledger.

18. The non-transitory computer-readable storage medium of claim 15, wherein the distributed ledger is a blockchain.

19. The non-transitory computer-readable storage medium of claim 15, wherein managing access to the file further comprises:

receiving an access request from a user associated with the first party, wherein the access request is based on a domain certificate associated with the first party;

validating an identity of the user based on the access request; and recording the access request from the user on the distributed ledger.

20. The non-transitory computer-readable storage medium of claim 19, wherein the user is associated with a user certificate, and wherein the user certificate is based on the domain certificate.

* * * * *